(12) United States Patent
Alston

(10) Patent No.: US 7,574,755 B1
(45) Date of Patent: Aug. 18, 2009

(54) AIR BAG APPARATUS

(76) Inventor: Lester Alston, 712 Clinton St., Buffalo, NY (US) 14210-1129

( * ) Notice: Subject to any disclaimer, the term of this patent is extended or adjusted under 35 U.S.C. 154(b) by 0 days.

(21) Appl. No.: 12/211,414

(22) Filed: Sep. 16, 2008

(51) Int. Cl.
*B63C 9/08* (2006.01)

(52) U.S. Cl. .......................................... 2/463; 441/117

(58) Field of Classification Search ............. 2/463; 280/730.1; 180/271; 441/106, 117
See application file for complete search history.

(56) References Cited

U.S. PATENT DOCUMENTS

| | | | |
|---|---|---|---|
| 6,230,333 B1 * | 5/2001 | Umeda | 2/463 |
| 6,350,168 B1 * | 2/2002 | Kroll et al. | 441/111 |
| 7,004,808 B1 * | 2/2006 | Nelson et al. | 441/106 |
| 7,059,925 B2 * | 6/2006 | Smith et al. | 441/106 |
| 7,261,608 B2 * | 8/2007 | Haddacks | 441/80 |
| 2004/0244100 A1 * | 12/2004 | Haddacks | 2/463 |
| 2007/0075528 A1 * | 4/2007 | Makabe et al. | 280/730.1 |

* cited by examiner

*Primary Examiner*—Stephen Avila
(74) *Attorney, Agent, or Firm*—Jennifer Meredith; Meredith & Keyhani, PLLC

(57) ABSTRACT

An air bag apparatus comprising a front portion, a back portion and a collar portion in inflatable communication with and between the front portion and the back portion. A lumbar attachment portion may be in inflatable communication with a bottom end of the back portion at a mid portion of the lumbar attachment portion and a first end removably attached to the front portion and a second end removably attaches to the front portion at the bottom left of the front portion. An air generator may be communication with at least one of the front portion, back portion and lumbar attachment portion for expanding the air bag apparatus; wherein the at least one air bag is capable of protecting an operator in response to expansion of the air bag by the air generator.

21 Claims, 8 Drawing Sheets

AIR BAG APPARATUS

The present invention relates to safety devices for persons riding personal vehicles, such as motorcycles, all terrain vehicles, bicycles and any open air apparatus.

Riders of motorcycles, all terrain vehicles, bicycles, and other open air apparatus often travel at high rates of speed. In the event of a fall from the vehicle, the rider has no protection for their body and in particular for their vital organs and spine. The present invention provides an apparatus that would protect the rider in the event of an accident and can be independently powered and actuated. Accordingly, it is suitable for even non-motorized personal vehicles.

The present invention also seeks to provide a self-contained apparatus for tandem personal vehicles riders, or two persons riding on one bicycle. One problem is that two separate airbags may cause one rider to knock the other rider off of the personal vehicle or increase injury in the event of a crash.

These and other features, aspects and advantages of the present invention will become better understood with reference to the following description and claims.

SUMMARY OF THE INVENTION

The present invention relates generally to safety devices and in particular an air bag apparatus.

According to one embodiment of the present invention, an air bag apparatus is provided, the apparatus comprising: a front portion, wherein the front portion is substantially rectangular; a back portion, wherein the back portion is substantially rectangular shaped having a top end and a bottom end and sized to cover at least the spine of the operator; a collar portion, wherein the collar portion is in inflatable communication with and between the front portion and the back portion; a lumbar attachment portion having a first end, second end and a mid portion between the first end and the second end, wherein the lumbar attachment portion is in inflatable communication with a bottom end of the back portion at the mid portion of the lumbar attachment portion and the first end removably attached to the front portion at the bottom right of the front portion and the second end removably attaches to the front portion at the bottom left of the front portion; an air generator in communication with at least one of the front portion, back portion and lumbar attachment portion for expanding the air bag apparatus; an actuator in communication with the air generator, wherein the actuator directs the air generator to supply air into the inside of the air bag apparatus to cause the air bag to expand.

According to another embodiment of the present invention, a double rider air bag apparatus is provided, the apparatus comprising: a front rider air bag, the front rider air bag comprising: a front portion, wherein the front portion is two substantially rectangular portions and a connector between the two substantially rectangular portions; a back portion, wherein the back portion is substantially rectangular shaped having a top end and a bottom end and sized to cover at least the spine of the operator; a collar portion, wherein the collar portion is in communication with and between the front portion and the back portion and does not inflatable; a lumbar attachment portion having a first end, second end and a mid portion between the first end and the second end, wherein the lumbar attachment portion is in inflatable communication with a bottom end of the back portion at the mid portion of the lumbar attachment portion and the first end removably attached to the front portion at the bottom right of the front portion and the second end removably attaches to the front portion at the bottom left of the front portion; a back rider air bag, the back rider air bag comprising: a front portion, wherein the front portion is two substantially rectangular portions wherein the two substantially rectangular portions are attached along one side and the two substantially rectangular portions not being in inflatable communication along the one side to allow for receipt of the back portion of the front rider air bag when the front rider air bag and the back rider air bag are inflated; a back portion, wherein the back portion is substantially rectangular shaped having a top end and a bottom end and sized to cover at least the spine of the operator, the back portion of the back rider air bag; a collar portion, wherein the collar portion is in communication with and between the front portion and the back portion and may be inflatable; a lumbar attachment portion having a first end, second end and a mid portion between the first end and the second end, wherein the lumbar attachment portion is in inflatable communication with a bottom end of the back portion at the mid portion of the lumbar attachment portion and the first end removably attached to the front portion at the bottom right of the front portion and the second end removably attaches to the front portion at the bottom left of the front portion; at least two air generators in communication with at least one of the front portion, back portion and lumbar attachment portion of each of the two air bag apparatus for expanding the air bag apparatus; at least one actuator in communication with at least one of the at least two air generators, wherein each the actuator directs at least one air generator to supply air into the inside at least one air bag apparatus to cause the air bag to expand; wherein the at least one air bag is capable of protecting an operator in response to expansion of the air bag by the air generator.

These and other features, aspects and advantages of the present invention will become better understood with reference to the following description and claims.

BRIEF DESCRIPTION OF THE DRAWINGS

FIGS. 1A-1C depict the present invention;
FIGS. 2A-2C depict the present invention;
FIGS. 3A-3B depict the present invention;
FIGS. 4A-4B depict the present invention;
FIGS. 5A-5B depicts the present invention;
FIG. 6 depicts the present invention;
FIGS. 7A-7F depict the present invention;
FIG. 8 depicts the present invention; and
FIGS. 9A-9C depict the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1A:
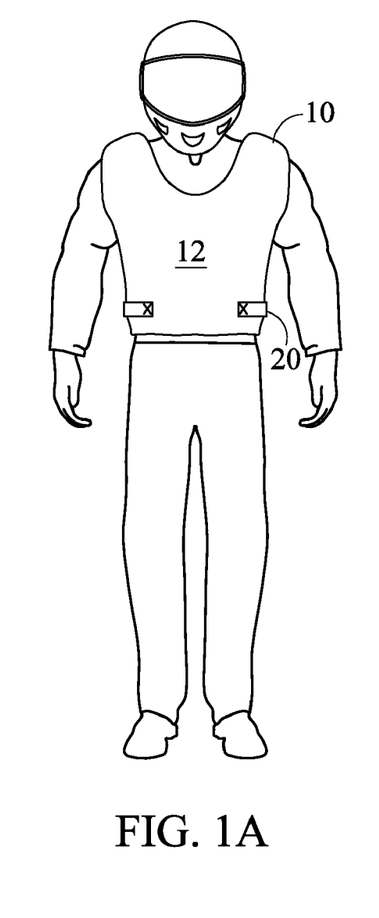
Figure 1B:
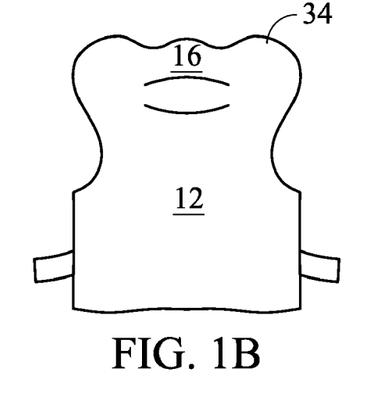
Figure 1C:
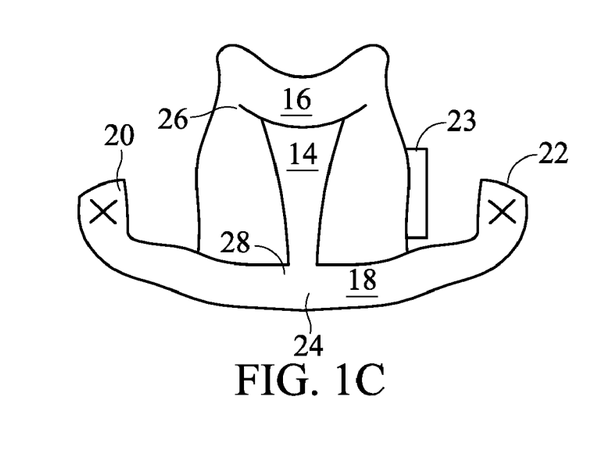

With reference to FIGS. 1A-1C, the present invention provides, an air bag apparatus, the apparatus (10) comprising: a front portion (12), wherein the front portion (12), as depicted in FIG. 1B, is substantially rectangular; a back portion (14), as depicted in FIG. 1C, wherein the back portion (14) is substantially rectangular shaped having a top end (26) and a bottom end (28) and sized to cover at least the spine of the operator. According to the embodiment shown the back portion is an elongated rectangular shape and is slightly larger than the users spine. There is also a collar portion (16), wherein the collar portion (16) is in inflatable communication with and between the front portion (12) and the back portion (14). The term inflatable communication refers to the fact each portion is not individually sealed and inflated, but rather the entire vest inflates with air flows between the front portion, back portion and collar portion. Certain portions, in certain embodiment may not expand, but would allow for air to flow through. For example, the collar portion (16) may not always fully inflate, but there would be a small opening between inside the collar portion to allow air to flow from the front portion (10) to the back portion (14). There may also be a lumbar attachment portion (18) having a first end (20), second end (22) and a mid portion (24) between the first end (20) and the second end (22). The lumbar attachment portion (18) is in inflatable communication with a bottom end (28) of the back portion (14) at the mid portion (24) of the lumbar attachment portion (18) and the first end (20) is removably attached to the front portion (20) at the bottom right of the front portion (20) and the second end (22) removably attaches to the front portion (12) at the bottom left of the front portion (12). There is an air generator (23) in communication with at least one of the front portion (12), back portion (14) and lumbar attachment portion (18) for expanding the air bag apparatus. The air generator may be a gas generator including a $CO_2$ cartridge or gas generating pellet. There may also be an actuator (40) in communication with the air generator (23), wherein the actuator (40) directs the air generator to supply air into the inside of the air bag apparatus (10) to cause the air bag (10) to expand. There may be a release valve to let air our of the air bag apparatus in the case of a multiple use air bag (it would require a new air generator, such as a new $CO_2$ cartridge). Alternatively, the air bag may be a single use air bag that must be disposed of once deployed.

Figure 6:
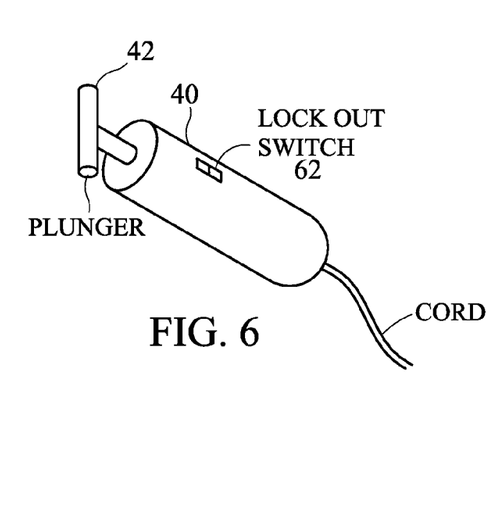
Figure 7A:
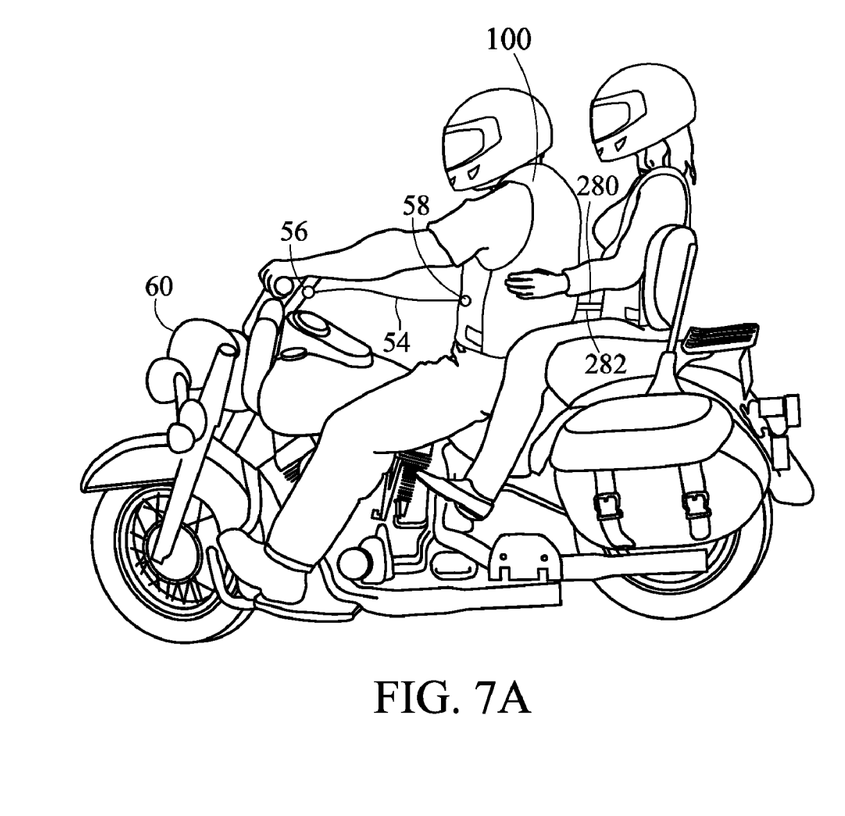
Figure 7B:
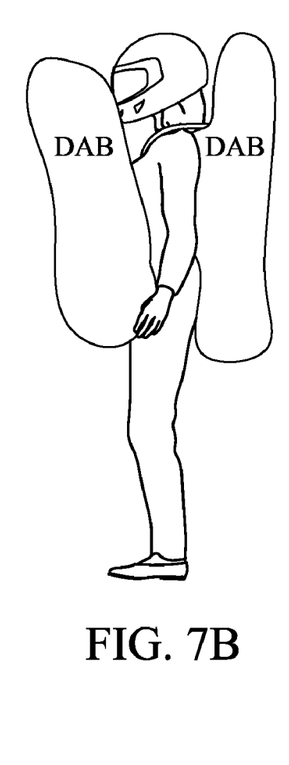
Figure 7C:
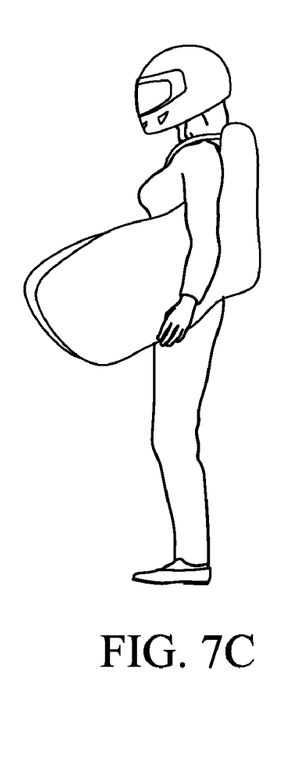
Figure 7D:
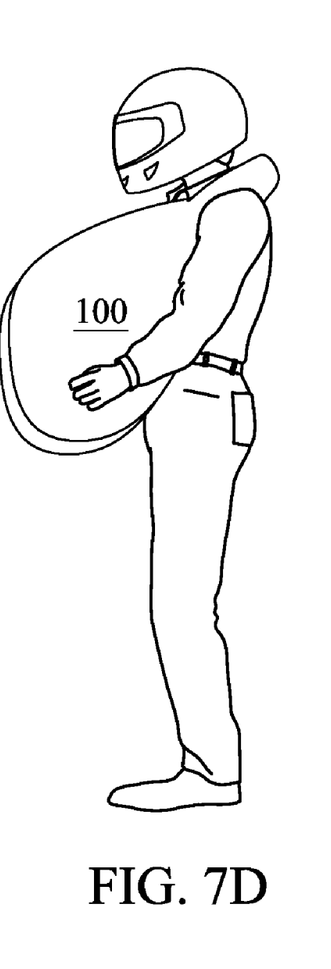
Figure 7E:
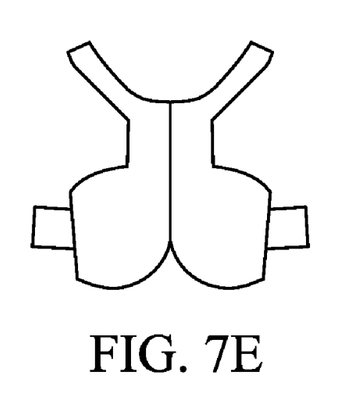
Figure 7F:
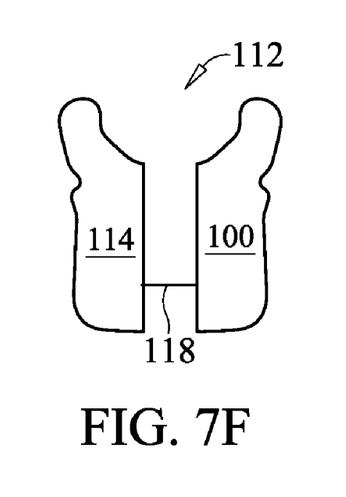

The actuator (40) is in communication with the air generator (23) and actuates or directs the air generator to supply air into the inside of the air bag apparatus (10) to cause the air bag (10) to expand. As depicted in FIG. 7A, the actuator may be a cord (54) having a cord first end (56) and a second end (58) wherein the first end (56) is fixedly attached to a personal vehicle (60) and the second end (58) is removably attached to a portion of the air bag apparatus (10) and wherein the second end (58) is disconnected from the air bag apparatus (10) the air generator (23) supplies air into the inside of the air bag apparatus (10) to cause the air bags expansion. As depicted in FIG. 6, the actuator (40) is a push button plunger (42) wherein the air generator (23) supplies air into the inside of the air bag in response to the operator pressing the push button plunger (42). There may also be a plunger safety device, such as a lock out switch (62) as depicted in FIG. 6, wherein the plunger safety device prevents the push button plunger from being pressed. This is a safety option and would prevent the device from actuating. This may be useful for many times, but for example, when the user is wearing the vest, but is not on the open air apparatus (e.g. motorcycle 60).

Figure 2A:
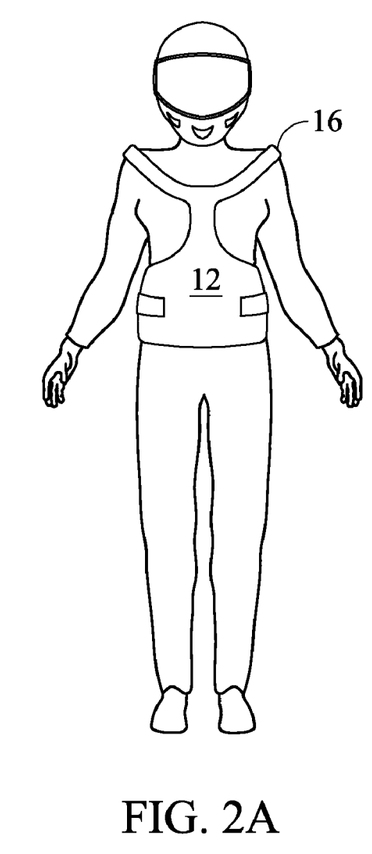
Figure 2B:
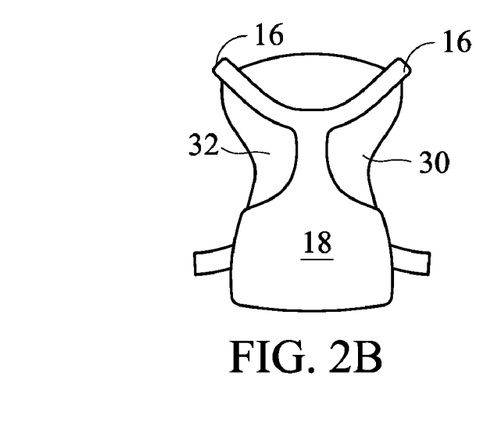
Figure 2C:
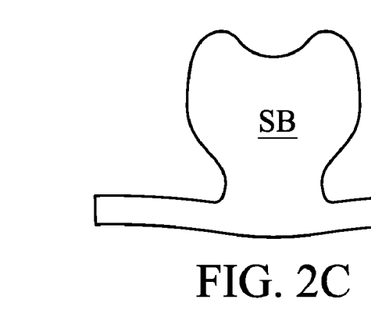
Figure 3A:
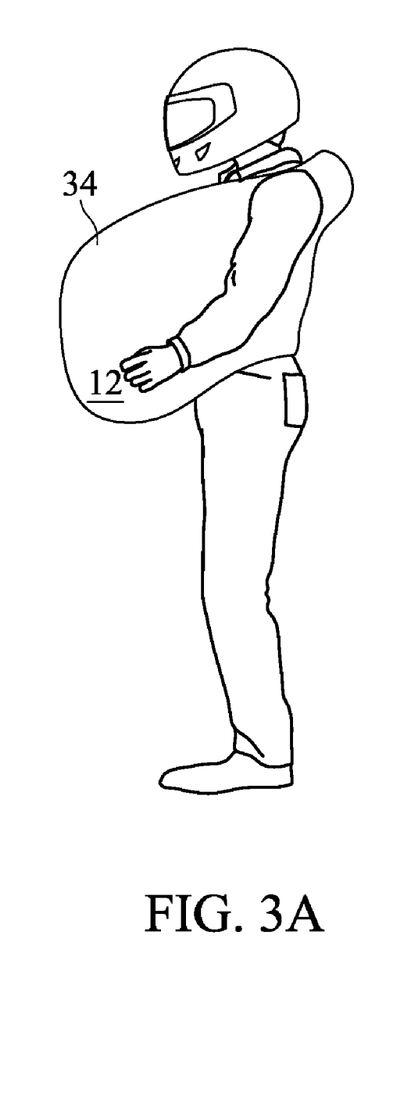
Figure 3B:
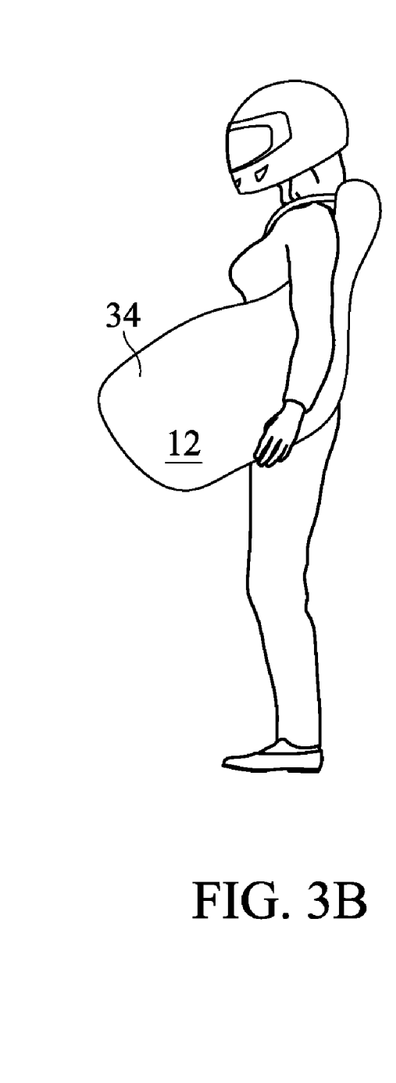
Figure 4A:
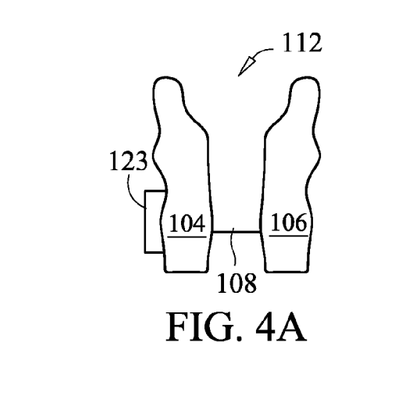
Figure 4B:
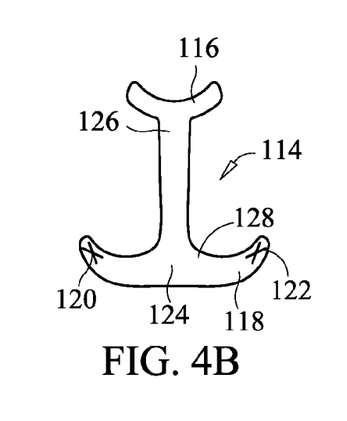
Figure 8:
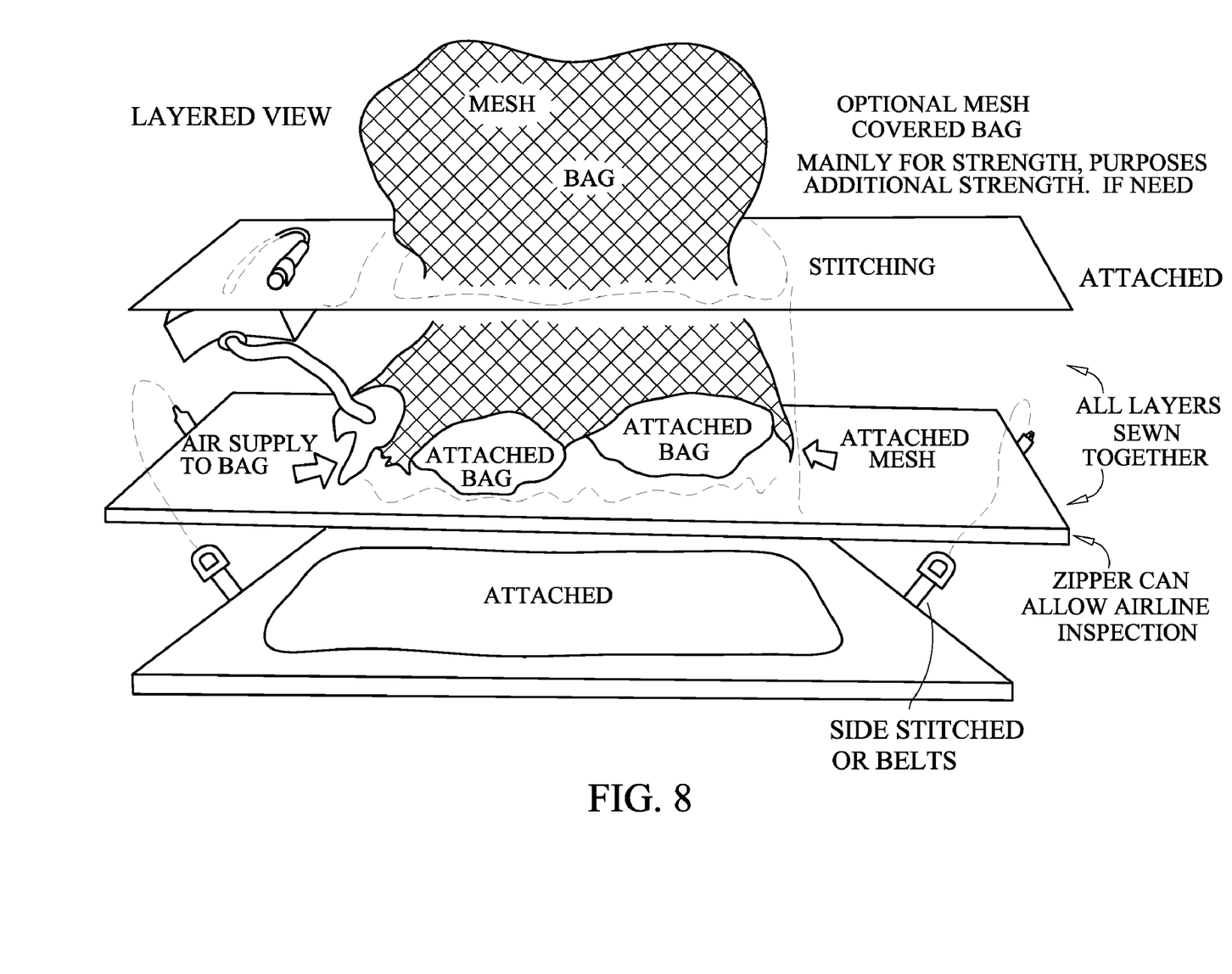

The air bag may be tailored for a female rider as shown in FIGS. 2A-2C. According to this embodiment, the collar portion (16) meets the front portion (12) at the middle of the front portion (12) to create two substantially triangular cut outs (30, 32) to adapt the air bag for a female rider. The female rider air bag also has a larger lumbar attachment portion, which would fully cover the back of the female rider (as can be seen in FIG. 2C and the side view of the inflated air bag apparatus as in FIG. 3B. There may also be an expandable screen mesh (34) cover surrounding the outside of the air bag. The purpose of this is to prevent undue scraping on the outside of the air bag, which can lead to many problems when the air bag is both deployed or expanded and when the airbag is not deployed or expanded. FIG. 8 is intended to depict the layering of the Mesh bag (34) and that is slightly larger than and surrounds the air bag. Note that FIG. 8 is not shaped as in the apparatus, but is a cut away exploded view, that is only intended to depict the manner in which the mesh bag is on top of and slightly larger than the air bag. There may also be an anti-static coating on the outer layer of the air bag apparatus. One example of an anti-static coating is polytetrafluoroethylene (PTFE) based fluoropolymer resin coated fabric. Some examples of products known to provide anti-static coatings are Teflon® and PRECISIONFAB™ fabrics.

Figure 5A:
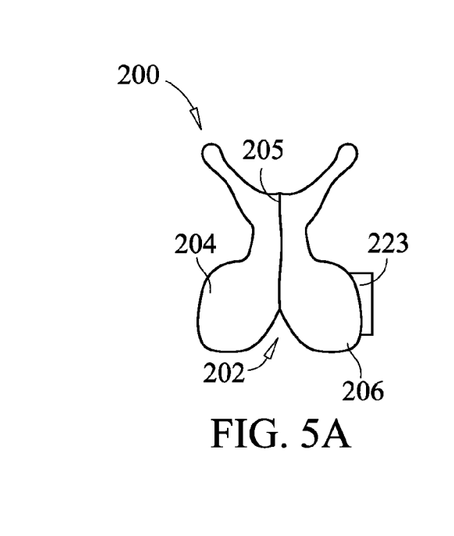
Figure 5B:
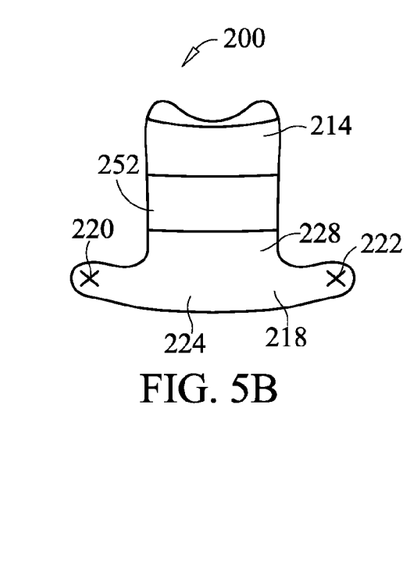

The present invention also envisions a global positing system (64) attached to at least a portion of the air bag apparatus. This may be useful in the event of an injured passenger to locate the individual. There may also be a reflective material on at least a portion of the air bag. FIG. 5B depicts reflective material (252) according to a preferred embodiment, which is along the back side of the user. The reflective material must expand, or break away to allow the air bag to expand in the event of a crash or deployment.

According to another preferred embodiment, a double rider air bag apparatus is provided as depicted in FIGS. 7A-7F, the apparatus comprising: a front rider air bag (100), said front rider air bag (100) comprising: a front portion (112), wherein the front portion (112) is two substantially rectangular portions (104, 106) and a connector (118) between the two substantially rectangular portions (104, 106); a back portion (114), wherein the back portion (114) is substantially rectangular shaped having a top end (126) and a bottom end (128) and sized to cover at least the spine of the operator; a collar portion (116), wherein the collar portion (116) is in communication with and between the front portion (112) and the back portion (114) and may or may not inflate. However, if the collar does not inflate it allow a thin stream or tube of air to run from the front portion (112) to the back portion (114) or vice versa, as it is important that the vest be inflatable from a single air source. There is also a lumbar attachment portion (118) having a first end (120), second end (122) and a mid portion (124) between said first end (120) and said second end (122), wherein the lumbar attachment portion (118) is in inflatable communication with a bottom end (128) of the back portion (114) at the mid portion (124) of the lumbar attachment portion (118) and the first end (120) removably attached to said front portion (112) at the bottom right of the front portion (112) and the second end (122) removably attaches to the front portion (112) at the bottom left of the front portion (112).

There is also a back rider air bag (200), the back rider air bag (200) comprising: a front portion (212), wherein the front portion (212) is two substantially rectangular portions (204, 206) wherein the two substantially rectangular portions (204, 206) attached along one side (205) and the two substantially rectangular portions (204, 206) are not in inflatable communication along one side (205) to allow for receipt of the back portion (114) of the front rider air bag (200) when the front rider air bag (100) and the back rider air bag (200) are inflated. In this way, the front rider would not knock the back rider off of the motorcycle, bicycle, etc. if depoyed. Rather, the back portion (114) of the front riders air bag (100) would sit in the one side (205) which connects the two substantially rectangular portions (204, 206). By way of example, the left substantially rectangular portion (204) may be in communication with the right substantially rectangular portion (206) by a zipper running along the one side (205) to removably connect the left substantially rectangular portion (204) to the right substantially rectangular portion (206) and allow each side to inflate, yet create a creases where in back portion (114) of the front rider could sit in the event of the air bag expanding. The back portion (214) of the rear rider may be larger to cover the majority of the users back and substantially rectangular shaped having a top end (226) and a bottom end (228) and sized to cover at least the spine of the operator and preferably the majority of the back of the back rider. There is also a collar portion (216), wherein the collar portion is in communication with and between the front portion (212) and the back portion (214) and may be inflated. A lumbar attachment portion (218) is provided having a first end (220), second end (222) and a mid portion (224) between the first end (220) and the second end (222), wherein the lumbar attachment portion (218) is in inflatable communication with a bottom end (228) of the back portion (214) at the mid portion (224) of the lumbar attachment portion (218) and the first end (220) removably attached to the front portion (220) at the bottom right of the front portion (212) and the second end (222) removably attaches to the front portion (212) at the bottom left of the front portion (212); At least one air generator (123, 223) is in communication with at least one of the front portion, back portion and lumbar attachment portion of each of the two air bag apparatus for expanding at least one of the two air bag apparatus. There may be one air generator on either the front or back rider that provides air to cause one or both of the air bags to expand. However, it is preferable that each air bag has their own air generator. There may also be at least one actuator in communication with at least one of the at least two air generators, wherein the actuator directs at least one air generator to supply air into the inside at least one air bag apparatus to cause the air bag to expand. The actuator may automatically direct air to be supplied into either the front or back air bag apparatus or both, in which case the air bag would protect the an operator in response to expansion of the air bag by the air generator in the event of an accident. As depicted in FIG. 7A, the actuator (54) may be a cord having a first end (56) and a second end (58) wherein the first end (56) is fixedly attached to a personal vehicle (60) and the second end (58) is removably attached to a portion of the air bag apparatus (100) and wherein the second end (58) is disconnected from the air bag apparatus the air generator supplies air into the inside of the air bag apparatus to cause the air bags expansion. Please note that the cord may be attached to the front rider air bag (100) or the back rider air bag (200). The actuator may also be a push button plunger (42) which is operated by either the front rider or the back rider and the air generator supplies air into the inside of one or both of the air bags in response to the operator (front rider or back rider) pressing the push button plunger (42). The actuator, according to one embodiment, includes a microprocessor, and the actuator may be "on" or "off" according to the lock out switch. The microprocessor accepts information from the actuator, such as "on" or "off" and deploy/expand which would be when the button is pressed or in response to an automatic event, such as a crash (which may be sensed by a sensor in the air bag apparatus, or on the vehicle) and the microprocessor directs the air generator according to that information/directive from either a mechanical actuator, such as a push button actuator or from a sensor actuator or from either or both. The air bag apparatus may connect into the circuitry of the vehicle of the user, or may be self contained. The power source may be a battery, solar powered or the open air apparatus (e.g. motorcycle, scooter) power source.

The collar portion of at least one of the front rider air bag and the back rider air bag meets the front portion at the middle of the front portion to create two substantially triangular cut outs to adapt the air bag for a female rider.

Figure 9A:
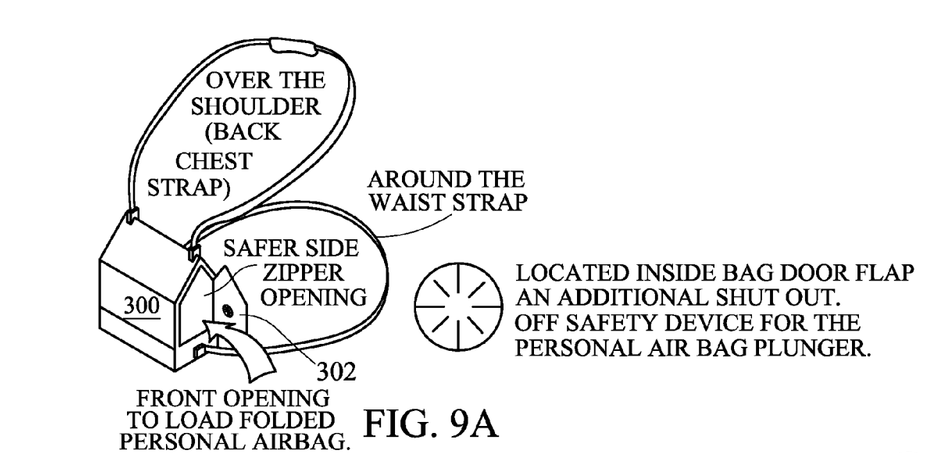
Figure 9B:
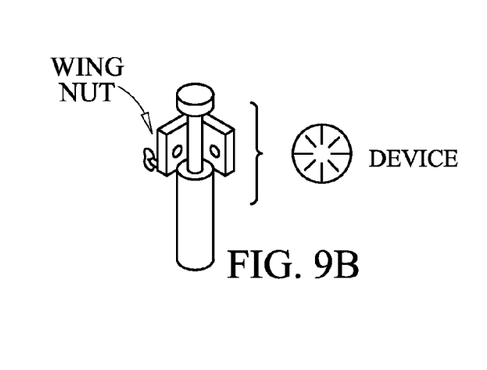
Figure 9C:
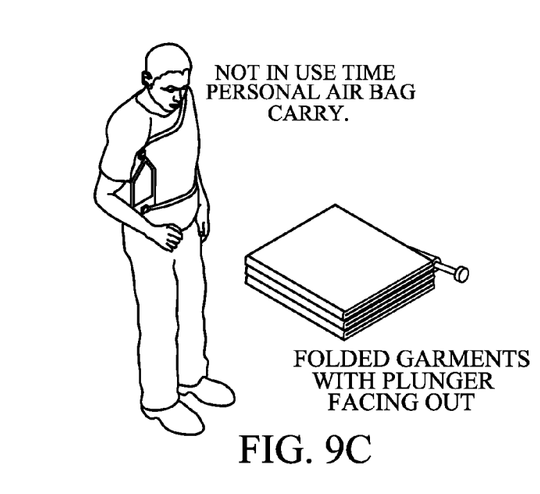

The air bag may have an expandable screen mesh (34) cover surrounding the outside of the air bag(s) either front rider air bag (100) or back rider air bag (200) or both may have the screen mesh cover (34). The actuator is in communication with at least two air generators, wherein said actuator directs at least one air generators to supply air into the inside of said front rider air bag and said back rider air bag to provide a single actuator for double riders. There may be a connection means (280) between the front rider air bag and the back rider air bag. The connection means (280) according to a preferred embodiment may be a strap that connects the front rider to the back rider. There may also be a separator air bag (282) wherein the separator air bag is between the front rider air bag (100) and the back rider air bag (200). As depicted in FIGS. 9A-9C, the air bag apparatus may be contained in an over the shoulder side opening bag (300) with side open (302).

It should be understood that the foregoing relates to preferred embodiments of the invention and that modifications may be made without departing from the spirit and scope of the invention as set forth in the following claims.

I claim:

1. An air bag apparatus, said apparatus comprising:
a front portion, wherein said front portion is substantially rectangular;
a back portion, wherein said back portion is substantially rectangular shaped having a top end and a bottom end and sized to cover at least the spine of the operator;
a collar portion, wherein said collar portion is in inflatable communication with and between said front portion and said back portion;
a lumbar attachment portion having a first end, second end and a mid portion between said first end and said second end, wherein said lumbar attachment portion is in inflatable communication with a bottom end of said back portion at said mid portion of said lumbar attachment portion and said first end removably attaches to said front portion at the bottom right of said front portion and said second end removably attaches to said front portion at the bottom left of said front portion;
an air generator in communication with at least one of said front portion, back portion and lumbar attachment portion for expanding said air bag apparatus; and
an actuator in communication with said air generator, wherein said actuator directs said air generator to supply air into the inside of said air bag apparatus to cause said air bag to expand.

2. An air bag as in claim 1, wherein said actuator is a cord having a first end and a second end wherein said first end is fixedly attached to a personal vehicle and said second end is removably attached to a portion of said air bag apparatus and wherein said second end is disconnected from said air bag apparatus said air generator supplies air into the inside of said air bag apparatus to cause said air bags expansion.

3. An air bag as in claim 1, wherein said actuator is a push button plunger wherein said air generator supplies air into the inside of said air bag in response to said operator pressing said push button plunger.

4. An air bag as in claim 1, wherein said collar portion meets said front portion at the middle of said front portion to create two substantially triangular cut outs to adapt said air bag for a female rider.

5. An air bag as in claim 1, further comprising an expandable screen mesh cover surrounding the outside of said air bag.

6. An air bag as in claim 1, further comprising an anti-static coating on the outer layer of said air bag apparatus.

7. An air bag as in claim 1, further comprising a global positing system attached to at least a portion of said air bag apparatus.

8. An air bag as in claim 3, further comprising a plunger safety device, wherein said plunger safety device prevents said push button plunger from being pressed.

9. An air bag as in claim 1, wherein at least a portion is a reflective material.

10. A double rider air bag apparatus, said apparatus comprising:
   A front rider air bag, said front rider air bag comprising:
      a front portion, wherein said front portion is two substantially rectangular portions and a connector between said two substantially rectangular portions;
      A back portion, wherein said back portion is substantially rectangular shaped having a top end and a bottom end and sized to cover at least the spine of the operator;
      A collar portion, wherein said collar portion is in communication with and between said front portion and said back portion;
      A lumbar attachment portion having a first end, second end and a mid portion between said first end and said second end, wherein said lumbar attachment portion is in inflatable communication with a bottom end of said back portion at said mid portion of said lumbar attachment portion and said first end removably attached to said front portion at the bottom right of said front portion and said second end removably attaches to said front portion at the bottom left of said front portion;
   A back rider air bag, said back rider air bag comprising:
      a front portion, wherein said front portion is two substantially rectangular portions wherein said two substantially rectangular portions attached along one side and said two substantially rectangular portions not being in inflatable communication along said one side to allow for receipt of said back portion of said front rider air bag when said front rider air bag and said back rider air bag are inflated;
      A back portion, wherein said back portion is substantially rectangular shaped having a top end and a bottom end and sized to cover at least the spine of the operator, said back portion of said back rider air bag;
      A collar portion, wherein said collar portion is in communication with and between said front portion and said back portion;
      A lumbar attachment portion having a first end, second end and a mid portion between said first end and said second end, wherein said lumbar attachment portion is in inflatable communication with a bottom end of said back portion at said mid portion of said lumbar attachment portion and said first end removably attached to said front portion at the bottom right of said front portion and said second end removably attaches to said front portion at the bottom left of said front portion;
   At least one air generators in communication with at least one of said front portion, back portion and lumbar attachment portion of each of said two air bag apparatus for expanding at least one of said two air bag apparatus;
   At least one actuator in communication with at least one of said at least two air generators, wherein each said actuator directs at least one air generator to supply air into the inside at least one air bag apparatus to cause said air bag to expand;
   Wherein said at least one air bag is capable of protecting an operator in response to expansion of said air bag by said air generator.

11. An air bag as in claim 10, wherein said actuator is a cord having a first end and a second end wherein said first end is fixedly attached to a personal vehicle and said second end is removably attached to a portion of said air bag apparatus and wherein said second end is disconnected from said air bag apparatus said air generator supplies air into the inside of said air bag apparatus to cause said air bags expansion.

12. An air bag as in claim 10, wherein said actuator is a push button plunger wherein said air generator supplies air into the inside of said air bag in response to said operator pressing said push button plunger.

13. An air bag as in claim 10, wherein said collar portion of at least one of said front rider air bag and said back rider air bag meets said front portion at the middle of said front portion to create two substantially triangular cut outs to adapt said air bag for a female rider.

14. An air bag as in claim 10, further comprising an expandable screen mesh cover surrounding the outside of said air bag.

15. An air bag as in claim 10, wherein said actuator is in communication with said at least two air generators, wherein said actuator directs at least one air generators to supply air into the inside of said front rider air bag and said back rider air bag to provide a single actuator for double riders.

16. An air bag as in claim 10, further comprising a connection means between said front rider air bag and said back rider air bag.

17. An air bag as in claim 10, further comprising an anti-static coating on the outer layer of said air bag apparatus.

18. An air bag as in claim 10, further comprising a separator air bag, wherein said separator air bag is between said front rider air bag and said back rider air bag.

19. An air bag as in claim 10, further comprising a global positing system attached to at least a portion of said air bag apparatus.

20. An air bag as in claim 12, said actuator further comprising a plunger safety device, wherein said plunger safety device prevents said push button plunger from being pressed.

21. An air bag as in claim 10, wherein at least a portion is a reflective material.

* * * * *